US012565157B2

(12) United States Patent
Schulze et al.

(10) Patent No.: US 12,565,157 B2
(45) Date of Patent: Mar. 3, 2026

(54) ABSORPTIVE SOUND INSULATION

(71) Applicant: Adler Pelzer Holding GmbH, Hagen (DE)

(72) Inventors: Volkmar Schulze, Schierling (DE); Maurizio Tarello, Caluso (IT)

(73) Assignee: ADLER PELZER HOLDING GMBH, Hagen (DE)

( * ) Notice: Subject to any disclaimer, the term of this patent is extended or adjusted under 35 U.S.C. 154(b) by 255 days.

(21) Appl. No.: 18/033,023

(22) PCT Filed: Sep. 9, 2021

(86) PCT No.: PCT/EP2021/074871
§ 371 (c)(1),
(2) Date: Apr. 20, 2023

(87) PCT Pub. No.: WO2022/083939
PCT Pub. Date: Apr. 28, 2022

(65) Prior Publication Data
US 2024/0001868 A1    Jan. 4, 2024

(30) Foreign Application Priority Data

Oct. 20, 2020    (DE) ..................... 10 2020 127 588.9

(51) Int. Cl.
B60R 13/08        (2006.01)
B32B 3/26         (2006.01)
(Continued)

(52) U.S. Cl.
CPC .......... B60R 13/0815 (2013.01); B32B 3/266 (2013.01); B32B 5/022 (2013.01);
(Continued)

(58) Field of Classification Search
CPC ..... B60R 13/0815; B32B 5/271; B32B 5/022; B32B 3/266
See application file for complete search history.

(56) References Cited

U.S. PATENT DOCUMENTS

| | | | |
|---|---|---|---|
| 5,458,835 A | 10/1995 | Wilkes et al. | |
| 7,137,477 B2 | 11/2006 | Keller et al. | |
| (Continued) | | | |

FOREIGN PATENT DOCUMENTS

| | | |
|---|---|---|
| DE | 102010050336 | 5/2011 |
| DE | 202012004594 | 10/2013 |
| (Continued) | | |

OTHER PUBLICATIONS

PCT International Search Report and Written Opinion issued in PCT International Patent Application Serial No. PCT/EP2021/074871, dated Dec. 23, 2021, with translation, 24 pages.

*Primary Examiner* — Forrest M Phillips
(74) *Attorney, Agent, or Firm* — HAYES SOLOWAY P.C.

(57) ABSTRACT

An absorption sound insulation for motor vehicle interiors and luggage compartments with absorption/stiffening non-wovens or 3D absorbers is formed of partially or completely cellulose wool, and includes a wear layer, and an absorbent/stiffening nonwoven fabric laminated thereunder formed of rayon of solid individual phases having a multi-leg cross-sectional shape with at least three legs, in which the legs of the cross-sectional profile each have a length/width ratio of at least 2:1 and the individual titre is 0.5 to 5 dtex.

9 Claims, 5 Drawing Sheets

(51) Int. Cl.
    *B32B 5/02*         (2006.01)
    *B32B 5/26*         (2006.01)

(52) U.S. Cl.
    CPC .......... *B32B 5/271* (2021.05); *B32B 2250/02* (2013.01); *B32B 2250/20* (2013.01); *B32B 2262/0261* (2013.01); *B32B 2262/0284* (2013.01); *B32B 2262/04* (2013.01); *B32B 2262/16* (2021.05); *B32B 2307/102* (2013.01); *B32B 2307/304* (2013.01); *B32B 2307/554* (2013.01); *B32B 2605/003* (2013.01); *B32B 2605/08* (2013.01)

(56)            References Cited

U.S. PATENT DOCUMENTS

| | | | |
|---|---|---|---|
| 9,975,283 B2 | 5/2018 | Nicolai et al. | |
| 2004/0121691 A1* | 6/2004 | Klein .................. | G10K 11/162 |
| | | | 442/389 |

| | | | |
|---|---|---|---|
| 2004/0126555 A1 | 7/2004 | Hartmann et al. | |
| 2008/0001431 A1* | 1/2008 | Thompson ............. | B60R 13/08 |
| | | | 181/290 |
| 2010/0003466 A1 | 1/2010 | Hessler | |
| 2015/0118437 A1 | 4/2015 | Schulze et al. | |
| 2017/0369005 A1 | 12/2017 | Iwata et al. | |
| 2020/0002847 A1* | 1/2020 | Steach .................... | D02G 1/00 |
| 2021/0061192 A1* | 3/2021 | Kwon ....................... | B32B 5/20 |
| 2024/0132000 A1* | 4/2024 | Schulze ................. | B32B 37/06 |

FOREIGN PATENT DOCUMENTS

| | | | | |
|---|---|---|---|---|
| DE | 102018114125 | | 12/2019 | |
| EP | 3409468 A1 * | | 12/2018 | ............. B32B 27/00 |
| EP | 3812151 A1 * | | 4/2021 | ............. B32B 1/00 |
| JP | S5067639 | | 6/1975 | |
| WO | WO2014082869 | | 6/2014 | |
| WO | WO2017114807 | | 7/2017 | |
| WO | WO2017114808 | | 7/2017 | |

* cited by examiner

ABSORPTIVE SOUND INSULATION

BACKGROUND OF THE INVENTION

The subject matter of the invention are absorptive sound insulation for motor vehicle interiors and luggage compartments with absorption/stiffening nonwovens or 3D absorbers comprising partially or completely rayon.

Viscose fibres, also known as viscose or rayon, comprise chemical fibres (regenerated fibres) that are industrially produced from the basic material cellulose using the viscose process. For example, sawdust is boiled with chemicals to dissolve out the cellulose. The cellulose is then processed with water, sodium hydroxide solution and carbon disulphide to form a viscose slurry, which is then solidified into viscose yarn through spinning nozzles.

The chemical composition of viscose fibres (basic component cellulose) is similar to that of cotton, as is their typical fibre fineness (about 10 to 15 μm in diameter) and fibre length (about up to 40 mm).

The use of viscose is similar to that of cotton (textiles, blended fabrics with polyester, etc.). Textiles made from it are processed into clothing. Examples of applications are tampons, wet wipes, cotton swabs, cleaning wipes and sponge wipes. Such products made of viscose have a high water absorption capacity. Viscose fibres make up about 11% of the synthetic fibre production.

The raw material for viscose fibres is cellulose, which in turn comes from beech, spruce, eucalyptus, pine, bamboo or similar wood. The cellulose quality used differs from paper cellulose quality in that the chain length of the cellulose molecules is shorter and the purity is higher. The cellulose for viscose production contains less residual lignin and fewer hemicelluloses or pentosans. It has better reactivity to sodium hydroxide solution and carbon disulphide and better solubility in sodium hydroxide solution after the xanthogenation reaction.

For the production of a spinning mass for spinning viscose fibres, the cellulose is first mixed with sodium hydroxide solution in the classic viscose process. The cellulose swells in the aqueous sodium hydroxide solution (mercerisation). On this carbon disulphide is allowed to act. This produces sodium xanthate (xanthat). The orange-yellow xanthate forms a viscous solution in an aqueous, diluted sodium hydroxide solution. This mass represents the viscose spinning mass.

After two or threefold filtration, post-ripening and deaeration, this spinning mass then has the suitable viscosity for the re-precipitation of the cellulose as viscose threads. This alkaline solution is pressed through nozzles into sulphuric acid salt solutions.

For the viscose fibres in the classic production process, a sulphuric acid spinning bath is used, which also contains sodium sulphate almost up to the saturation limit and a small amount of zinc sulphate to delay the cellulose precipitation reaction.

In the state of the art, various designs of sound insulation are known, which have acoustic and/or reinforcing nonwovens underneath the wear layer (visible surface); the nonwoven compositions of which are different. For example, carpets are widely used as the wear layer, in particular tufted, velour and flat needled nonwoven carpets.

Underneath the wear layer there are also adhesive layers, acoustic/stiffening, sealing and heavy foils as well as contact/foil nonwovens. The coating, mostly as an adhesive layer for underlays, but also for stiffening, comprises in particular thermoplastics, predominantly PE or PP.

The underlayers, such as acoustic and/or stiffening nonwovens, usually consist mainly of PET and mixed fibre nonwovens, often with a BiCo fibre content (BiCo=bicomponents). Thermoplastic films, in particular PE/PA and PE/PA/PE films as well as PE/PA/PE+PET nonwovens, are also used as sealing or insulating films. PE/PA stands for a film material that contains both polyethylene (PE) as the first layer and polyamide (PA) as the second layer. Depending on the acoustic requirements, so-called heavy films are also used as partial or full-surface insulation films.

Between the top layer (wear layer plus underlayers) and the car body floor there is usually also an insulation layer, which can be made of PUR foam or also of nonwoven structures (nonwovens or fibre flock (HMP) composites). If a foam is used, it is usually firmly bonded (foamed) to the upper material. Non-woven/fibre flock structures can also be firmly bonded to the upper fabric, wherein there are then usually glued. However, a pure overlapping without a firm connection is also used.

Particularly for vans, SUVs, pickups and light commercial vehicles, rubber, PUR-RIM, PVC and increasingly TPO are also used as a wear layer in the state of the art.

In motor vehicles, thermoformable acoustic and/or stiffening nonwovens are used in particular in the passenger compartment and luggage compartment. These are usually loosely compressed thermoset or thermoplastic bonded textile fibre nonwovens as well as combinations of foam and/or nonwoven layers with the same or different flow resistances. In addition, so-called flow nonwovens are also used to tune the acoustics in a targeted manner.

In order to influence the sound absorption capacity in correlation with the tread stiffness, porous, air- and thus sound-open layers are inserted between the actual upper material (wear layer) and the process-related sealing and heavy layers or the insulation. Polyester and mixed fibre fleeces as well as micro-perforated foils are used as porous, air- and thus sound-open layers. The impact resistance is also influenced by the proportion of bicomponent fibres (BiCo) in the nonwovens.

In known floor covering insulations produced in the fibre flock process, the fibre mixture consists mainly of BiCo and PET fibres, as well as torn cotton and PU foam flocks.

Nonwoven applications in endwall material structures often involve single-layer nonwovens, multi-layer nonwovens and backfoamed nonwovens.

Non-woven fabrics and/or combinations of non-woven fabrics are also used in the luggage compartment, primarily for side trim panellings, tailgate trim panellings, wheel arch covers, luggage compartment lids and spare wheel recesses.

EP 0 301 874 B1 relates to regenerated cellulose filaments, in particular viscose filaments, having a multi-layer (multi-leg) cross-section, to fibres comprising such filaments and to products formed therefrom. One advantage of multi-layer viscose filaments over conventional viscose filaments with a circular cross-section is their greater mass, since the circumferential area of the multi-layer filaments is greater than their actual cross-sectional area.

A further advantage of multi-layer viscose filaments is their increased absorbency compared to conventional filaments. In the automotive sector, however, this is more of a disadvantage if the corresponding components are to dry again after exposure to water.

EP 0 301 874 B1 provides a solid filament of regenerated cellulosic material having a fibre fineness of less than 5.0 dtex and a multi-layer cross-section, wherein each member having an aspect ratio of length to width of at least 2:1. The aspect ratio of length to width of the filament members is generally from 2:1 to 10:1, preferably from 2:1 to 7:1 and more preferably from 3:1 to 5:1. Generally, the higher the aspect ratio, the higher the degree of free volume of the filaments. This gives a high degree of absorbency when the filaments are in staple fibre form, provided the limbs are not so long and thin that they bend back on themselves. The filament described here has preferably 3 or 4 limbs, although it may have more than 4 limbs if desired, and also preferably has a cross-sectional shape which is generally (i.e. substantially) symmetrical about at least one axis, as in a Y-, X-, H- or T-shaped filament cross-section, although other shapes may also be present in the extent of the invention. Preferably, the filament has a Y-shaped cross-section. The angle between the limbs varies depending on the cross-sectional shape and can be, for example, 5 to 180°, although it is preferred that the filament cross-section is as regular as possible.

The filament described here has a low fibre fineness (single titre) of less than 5.0 dtex, wherein a lower fibre fineness is advantageous for products with high absorbency. Generally, the fibre fineness is between 0.5 and 5.0 dtex, but more preferably between 1.5 and 4.0 dtex. The filaments are advantageously produced in the form of staple fibres. The combination of the multi-layer cross-sectional shape and the low fibre fineness results in filaments that have a high absorbency in staple fibre form. In addition, the fibre has a high bulk, a cotton-like feel and a toughness approximately equivalent to conventional viscose filaments of circular cross-section for a given viscose composition and fibre fineness.

The staple fibre preferably comprises multi-layer filaments that all have substantially the same cross-sectional shape. This allows easier control of fibre properties such as absorbency and bulk. However, if desired, the staple fibre may comprise a mixture of filaments having two or more different cross-sectional shapes, provided that at least some of the filaments have a multi-layer cross-section characteristic of the filaments described herein. Preferably, the filaments are viscose, and are suitably spun from a standard viscose composition using standard viscose spinning conditions, except that the conventional circular holes are replaced by multi-layer shaped extrusion holes in the spinneret. Since the filaments produced have a solid rather than a hollow structure, the disadvantages associated with the production of hollow filaments are avoided.

After spinning, the filaments are stretched and then preferably cut into staple lengths, washed and dried using conventional techniques to yield staple fibres.

Products formed from the fibre may contain only the aforementioned fibres, i.e. consist of them or be mixed with other fibres, i.e. containing them. These other fibres may be, for example, cellulosic fibres such as standard viscose or cotton or non-cellulosic fibres such as polyester. Additionally, the aforementioned fibre may be incorporated into a product in only one cross-sectional shape, for example only Y-shaped, or alternatively two or more different cross-sectional shapes may be used.

SUMMARY OF THE INVENTION

The object of the present invention, as compared with the aforementioned prior art, is thus to provide a nonwoven-fibre blend for absorbent-/reinforcement nonwoven and a 3D absorber-fibre blend comprising the partially or wholly rayon of solid individual phases of multi-leg cross-sectional shape, wherein there being at least three legs in which the legs of the cross-sectional profile each have a length/width ratio greater than 2:1 and the individual titre is 0.5-5 dtex.

DETAILED DESCRIPTION OF THE INVENTION

Figure 1:
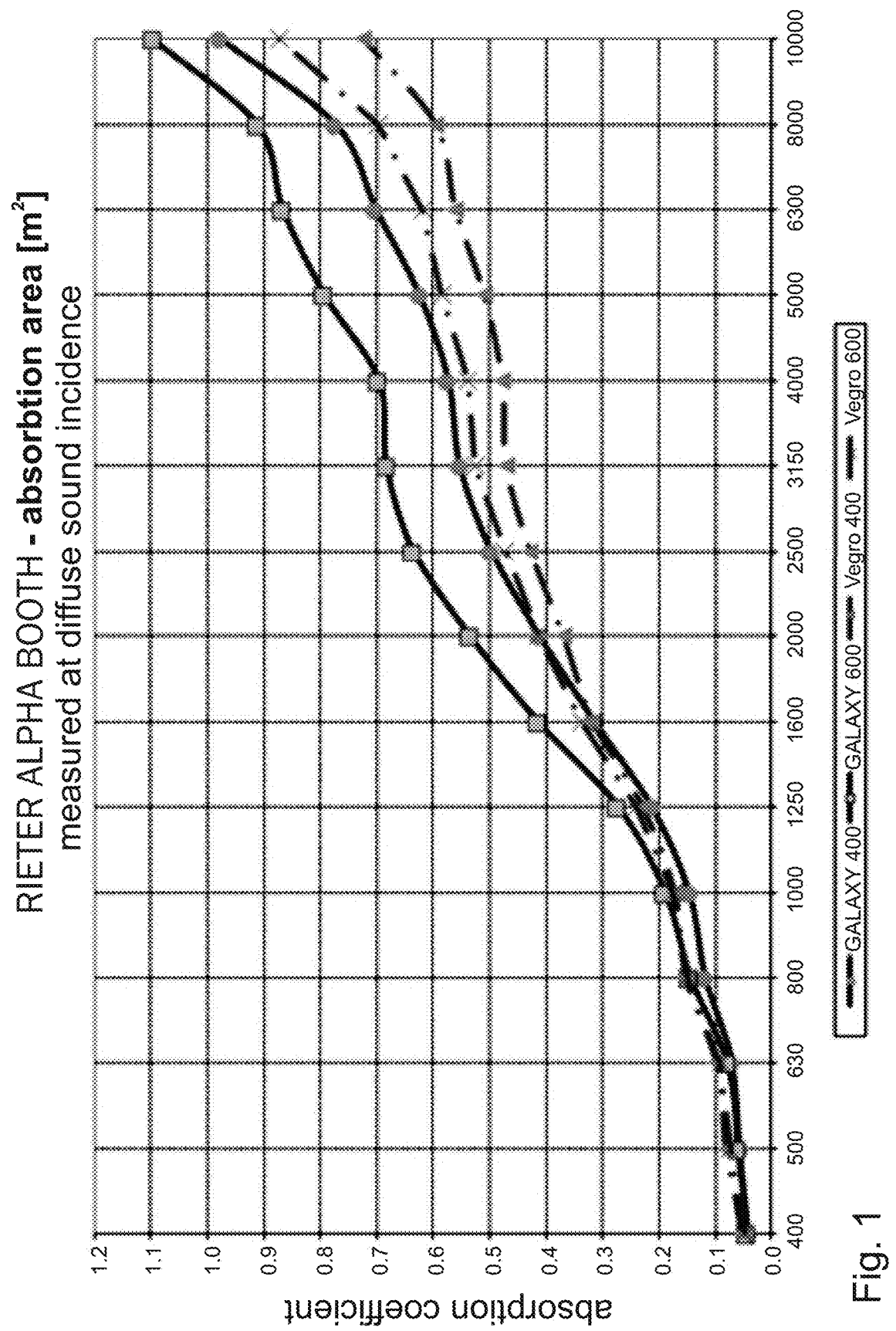
FIG. 1 plots sound absorption coefficiencies of various rayons in a standard alpha booth.

In a first embodiment, subject matter of the present invention is a sound insulation for the interior and luggage compartment of a motor vehicle comprising (a) a wear layer and (b) an absorbent/reinforcement nonwoven laminated thereunder comprising rayon of solid individual phases having a multi-leg cross-sectional shape with at least three legs, in which the legs of the cross-sectional profile each have a length/width ratio of at least 2:1 and the individual titre is 0.5 to 5 dtex.

While the prior art with respect to the above-mentioned fibres was essentially concerned with absorbency, the present invention is devoted for the first time to sound insulation using the above-mentioned fibres in a specific field of vehicle acoustics, in this case the motor vehicle interior and luggage compartment. Particularly preferred in the sense of the present invention are thus the interior bulkhead, floor panelling, incl. insulation, roof lining, parcel shelf, luggage compartment side trim, interior wheel arch cover, spare wheel well, luggage compartment lid and load floor.

No sound insulations are known in the prior art that contain partially or completely rayon made of solid individual phases with a multi-leg cross-sectional shape, wherein at least three legs are present, in which the legs of the cross-sectional profile each have a length/width ratio greater than 2:1 and the individual titre is 0.5-5 dtex.

Particularly preferably in the sense of the present invention, the absorbent/reinforcement nonwoven consists entirely of rayon from solid individual phases with a multi-leg cross-sectional shape with at least three legs, in which the legs of the cross-sectional profile each have a length/width ratio of at least 2 to 1 and the individual titre is 0.5 to 5 dtex. According to the invention, up to 95% by weight of the previously defined rayon can be replaced by other fibres.

In a further embodiment, a microperforated PA/PE film (e.g. 65 μm, 50 μm PA/15 μm PE, hole diameter 0.12 mm) with a nonwoven, for example consisting of 25 wt. % commercially available BiCo fibres [co-PET] and 75 wt. % rayon of solid individual phases with a multi-leg cross-sectional shape was used, wherein at least three legs are present, in which the legs of the cross-sectional profile each have a length/width ratio of at least 2 to 1 and the individual titre is 0.5 to 5 dtex.

A further preferred embodiment consists in the use of a fibre mixture of 35 wt. % BiCo and 65 wt. % rayon of solid individual fibres with a multi-leg cross-sectional shape, wherein at least three legs are present, in which the legs of the cross-sectional profile each have a length/width ratio of at least 2 to 1 and the individual titre is 0.5 to 5 dtex; from which a 3D floor covering insulation was produced in the fibre flocking process known per se.

A preferred fibre blend for sound insulation produced by the fibre flocking process comprises, for example, 25% by weight of BiCo, 20% by weight of PET with good crimp and 55% by weight of rayon from solid individual phases with a multi-leg cross-sectional shape, wherein at least three legs are present in which the legs of the cross-sectional profile each have a length/width ratio of at least 2 to 1 and the individual titre is 0.5 to 5 dtex.

This in turn can be laminated with a standard wear layer of tufted, velour or flat needlepunched nonwoven carpet.

Often intermediate layers, acoustic/reinforcement nonwovens and PE/PA/PE films (closed or micro-perforated) are used.

Essential elements of the present invention are sound insulation structures, in which the acoustic, mechanical and processing properties achieve a requirement-based optimizing/tuning by a target-oriented formulation of the fibre mixture with rayon from solid individual phases with a multi-leg cross-sectional shape, wherein at least three legs being present, in which the legs of the cross-sectional profile each have a length/width ratio of at least 2 to 1 and the individual linear density is 0.5 to 5 dtex.

A further preferred embodiment of the present invention relates to an absorptive sound insulation as defined above, comprising a 3D sound insulation geometry manufactured by fibre flocking (HMP technology).

The material of the wear layer can serve various purposes in the vehicle. Particularly preferably, the wear layer comprises (a1) a tufted carpet, in particular with the yarn materials PA6.6, PA6, PP, rPA and PET, rPET as well as the corresponding bio-based polyamides (PA 5.10; PA 6.10)

(a2) a velour and flat needled nonwoven carpet, in particular with the fibre materials PET, PET/PP, PP, PA/PET and rPET, (a3) a micro-perforated film or (a4) a PET or mixed fibre nonwoven.

In particular, the advantage of the present invention is the provision of deformable/stable nonwoven layers comprising or consisting of rayon of solid individual phases with multi-leg cross-sectional shape, wherein at least three legs are present, by which the legs of the cross-sectional profile each have a length/width ratio of at least 2 to 1 and the individual titre is 0.5 to 5 dtex; which are integrated into the material structure of sound insulations; as well as in the fibre mixture of 3D-absorbers with partly or completely rayon of solid individual phases with multi-leg cross-sectional shape, wherein at least three legs are present, in which the legs of the cross-sectional profile each have a length/width ratio of at least 2 to 1 and the individual titre is 0.5 to 5 dtex; produced in the fibre flocking process, and thus new, property-optimised sound insulations can be provided.

EXAMPLE OF EXECUTION

Example 1

To demonstrate the acoustic effectiveness, a 400 g/m² and a 600 g/m² needle fleece of commercially available rayon [GALAXY® VY Faser of Kelheim Fibres GmbH] were produced in each case from solid individual phases with a multi-leg cross-sectional shape, wherein at least three legs are present, in which the legs of the cross-sectional profile each have a length/width ratio of at least 2 to 1 and the individual titre is 0.5 to 5 dtex, in a manner known per se.

Example 2

Furthermore, a 400 g/m² (VEGRO 400) and a 600 g/m² (VEGRO 600) needled nonwoven in each case of 30 wt. % PET (12 dtex/length 64 mm), 30 wt. %

PET (11 dtex/length 60 mm) and 40 wt.-% PET (6.7 dtex/length 64 mm) are produced.

The absorption measurements, carried out in a standard alpha booth, are shown in FIG. 1.

Figure 2:
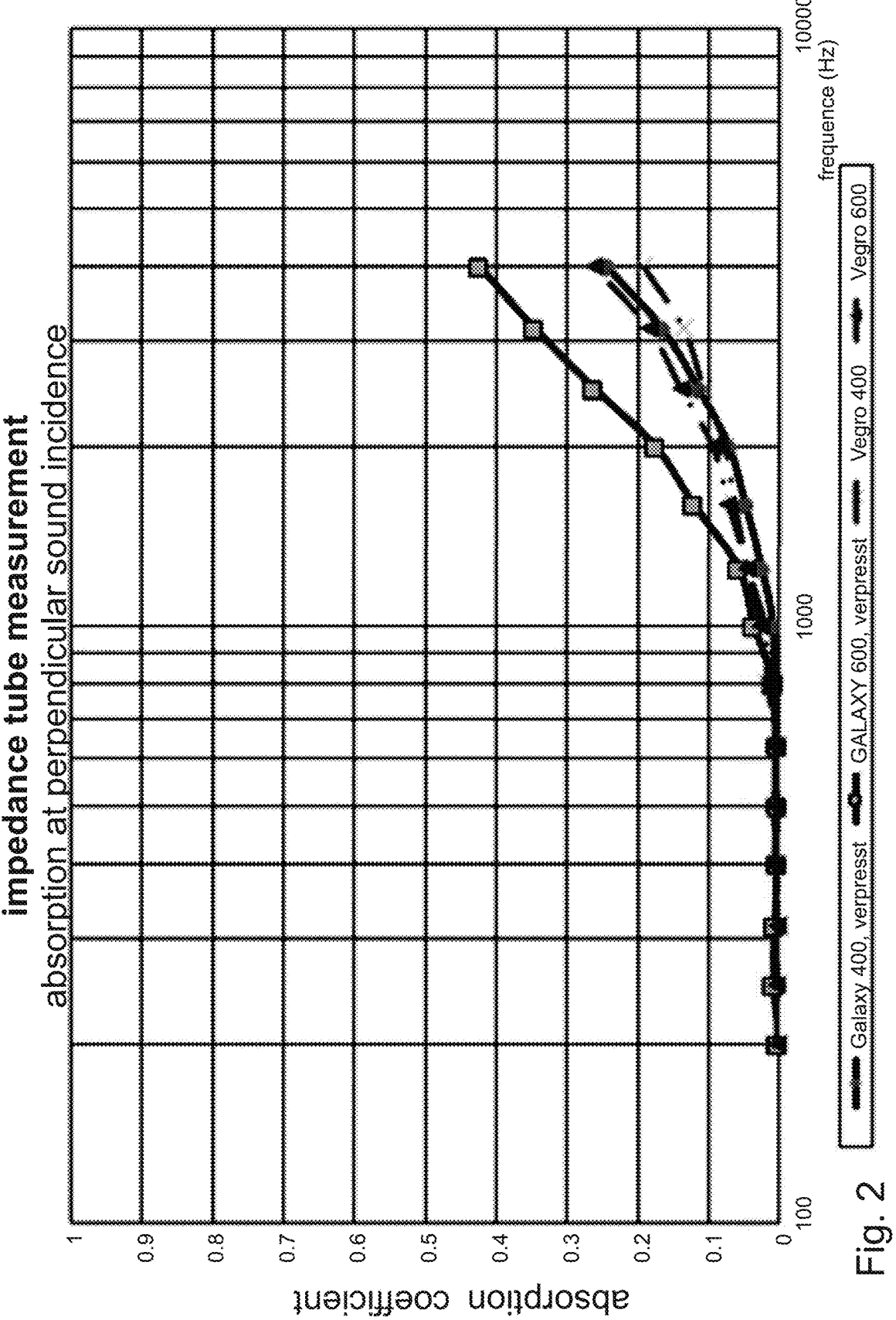
FIG. 2 plots sound absorption coefficiencies of various rayons in an impedance tube.

FIG. 2 shows the results of measurements in the impedance tube, pressed/unpressed.

Figs. clearly show the absorptive efficiency of the sound insulation according to the invention.

Example 3

Figure 3:
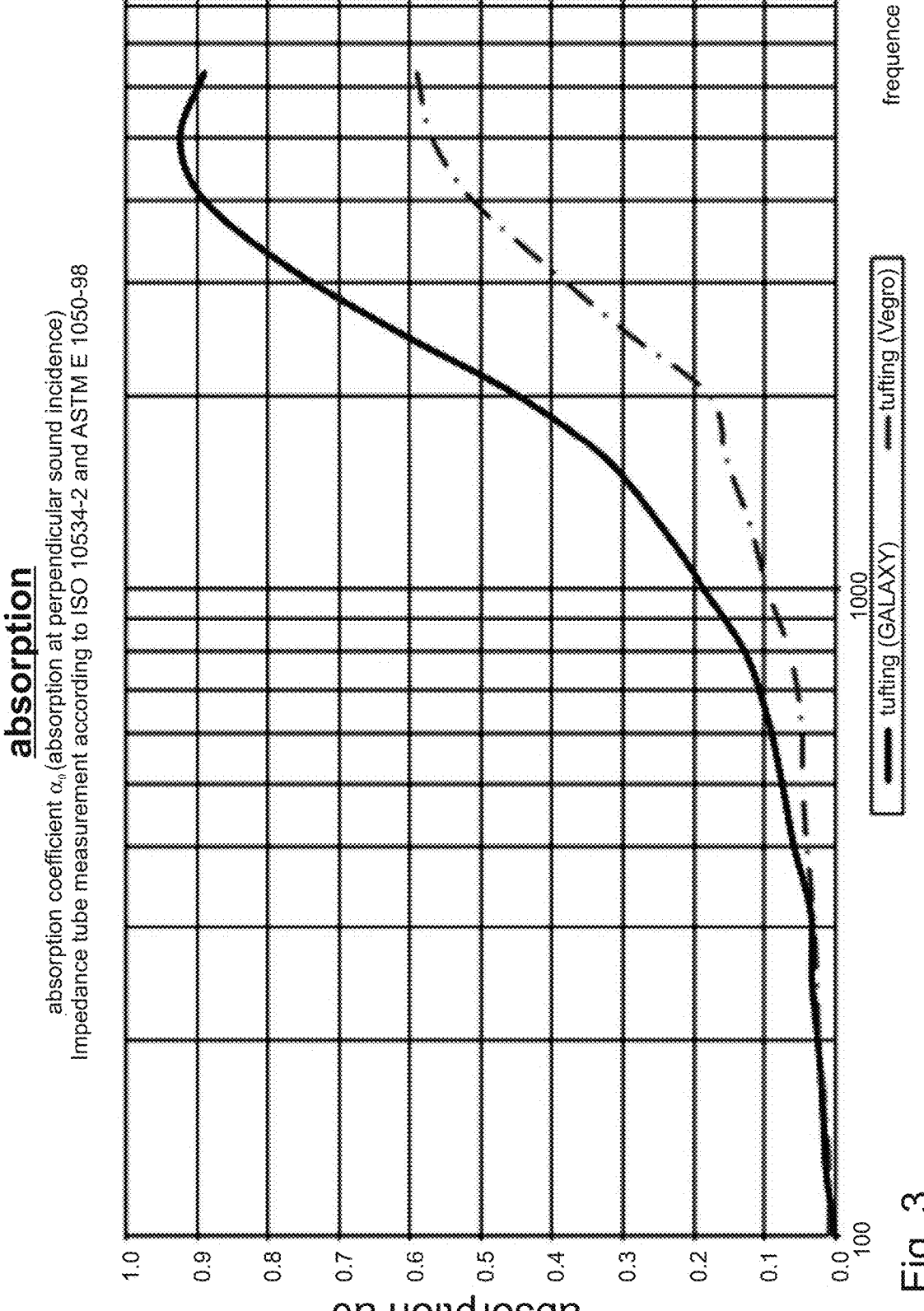
FIGS. 3-5 plots sound absorption efficiencies of various rayons laminated to a tufted carpet (FIG. 3), a velour carpet (FIG. 4), and a nonwoven (FIG. 5).
Figure 4:
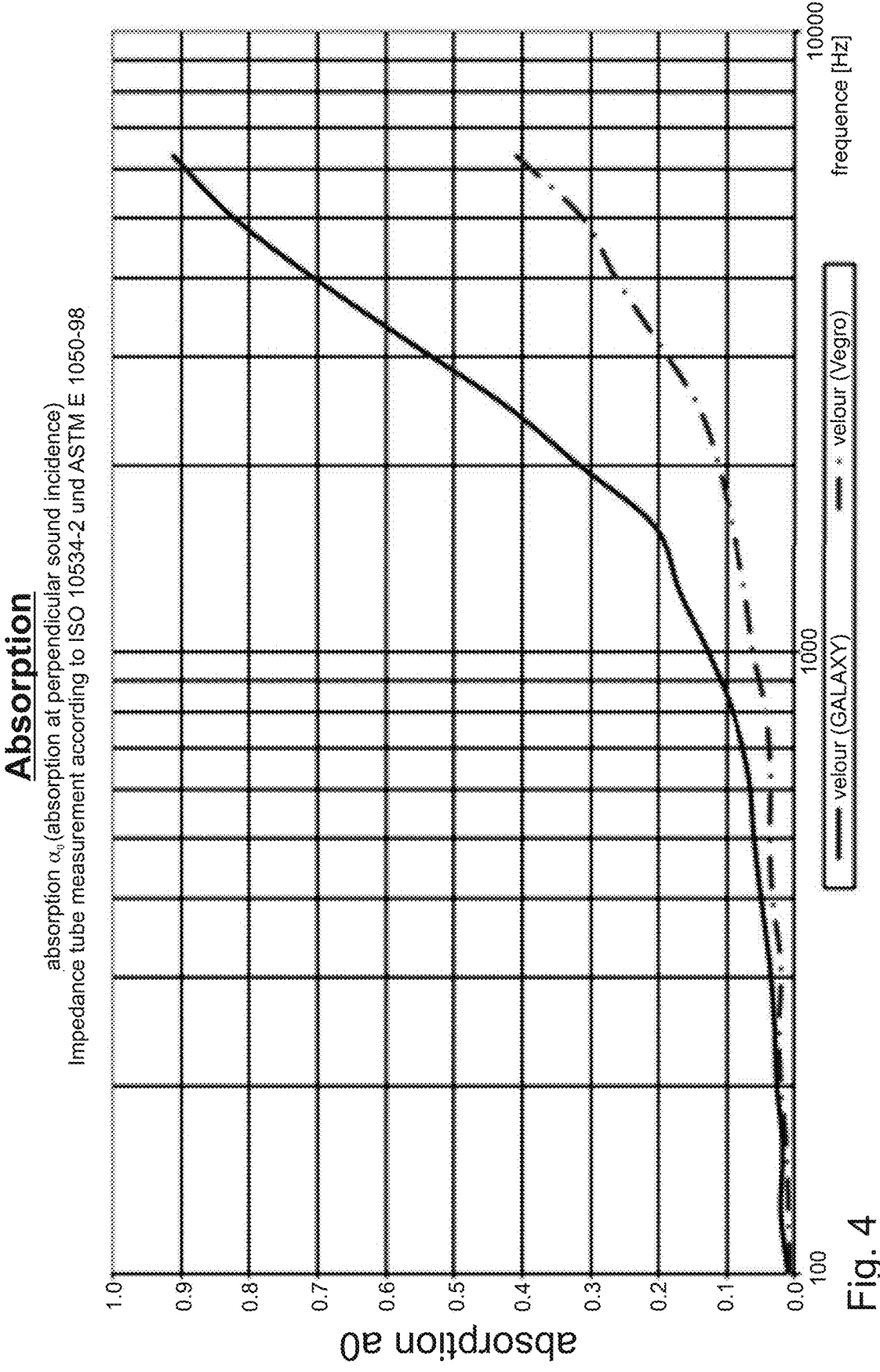
Figure 5:
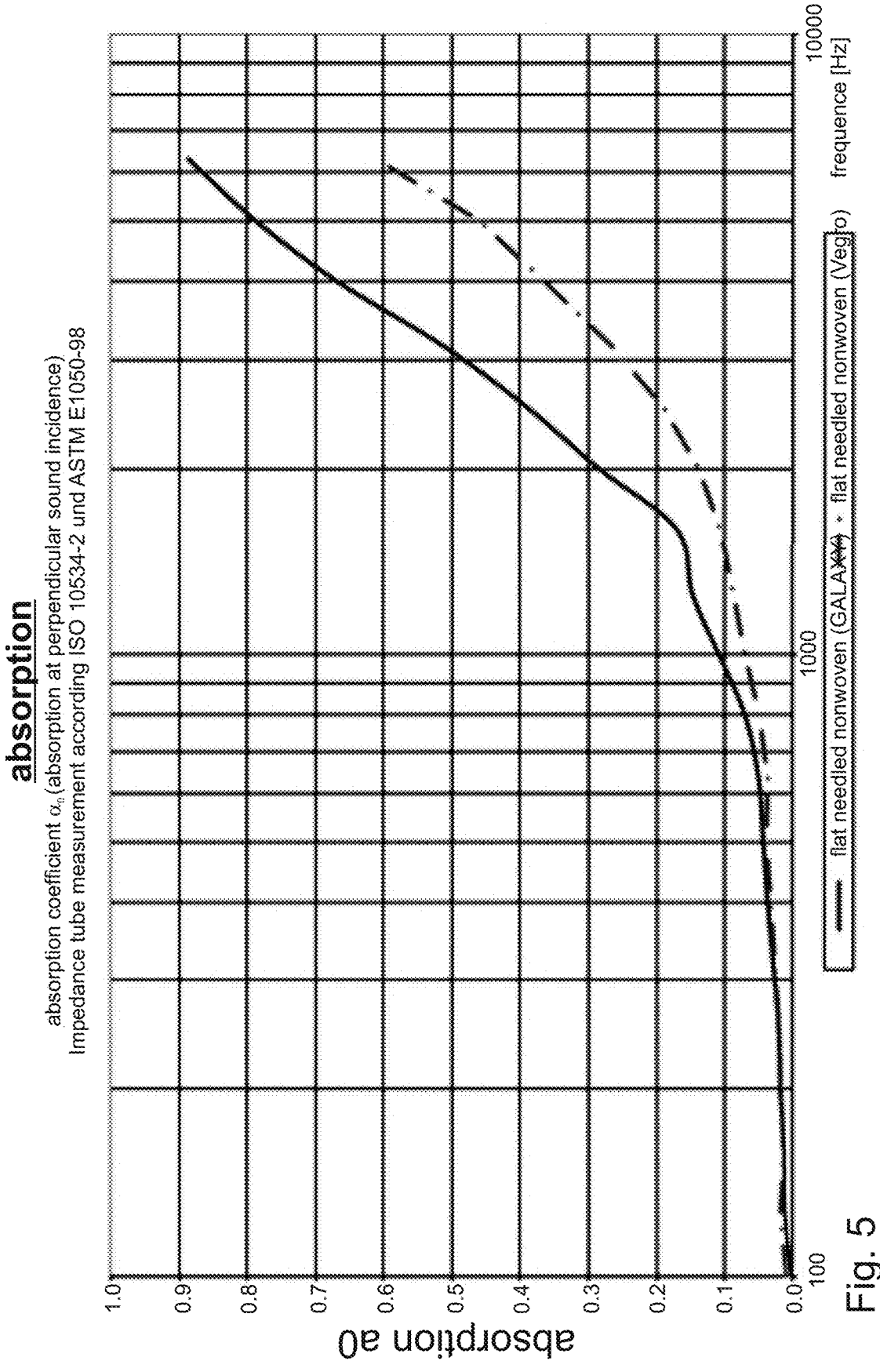

In application for floor and luggage compartment panellings, the 600 g/m² rayon needle punched nonwovens and the PET needle punched nonwovens according to examples 1 and 2 were laminated with a tufted carpet (600 g/m² PA), a velour carpet (560 g/m² PET) and a flat needle punched nonwoven (300 g/m²) respectively and measured in the impedance tube. The significantly better absorptive efficiency of the composites with rayon needled nonwovens according to the invention compared to the PET needled nonwoven can be seen in FIGS. 3 to 5.

The invention claimed is:

1. An absorptive sound insulation for the motor vehicle interior and luggage compartment consisting essentially of two layers:
    (a) a wear layer, wherein the wear layer comprises
        (a1) a tufted carpet,
        (a2) a velour and flat needlepunched nonwoven carpet, and
        (a3) a microperforated film, or
        (a4) a PET or blended fibre nonwoven and
    (b) an absorbent/stiffening nonwoven fabric layer laminated to the wear layer, and comprising rayon of solid individual phases having a multi-leg cross-sectional shape with at least three legs, in which the legs of the cross-sectional profile each have a length/width ratio of at least 2:1 and the individual titre is 0.5 to 5 dtex.

2. The absorptive sound insulation according to claim 1, wherein the absorption/stiffening nonwoven fabric layer contains 5 to 95% by weight of the rayon.

3. The absorptive sound insulation according to claim 1, wherein the absorption/stiffening nonwoven fabric layer consists of rayon.

4. The absorptive sound insulation according to claim 1, comprising a 3D sound insulation geometry manufactured by the fibre flocking process.

5. The absorptive sound insulation according to claim 1, in the form of an interior bulkhead, a floor panelling, thermal insulation, a roof lining, a parcel shelf, a luggage compartment side panelling, an interior wheel arch cover, a spare wheel well, a luggage compartment lid and a load floor.

6. The absorptive sound insulation according to claim 2, wherein the absorption/stiffening nonwoven fabric layer contains 15 to 70% by weight of the rayon.

7. The absorptive sound insulation according to claim 1, wherein the tufted carpet is formed of a yarn material selected from the group consisting of PA6.6, PA6, PP, rPA, PET, and rPET.

8. The absorptive sound insulation according to claim 1, wherein the tufted carpet is formed of a bio-based polyamide selected from the group consisting of PA 5.10 and PA 6.10.

9. The absorptive sound insulation according to claim 1, wherein the tufted carpet comprises a velour and flat nee- dlepunched nonwoven carpet formed of a fibre material selected from the group consisting of PET, PET/PP, PP, PA/PET and rPET.

\* \* \* \* \*